United States Patent
Kaiser et al.

(10) Patent No.: US 9,628,987 B2
(45) Date of Patent: Apr. 18, 2017

(54) METHOD FOR INTEGRATING A FIELD DEVICE INTO A PROCESS AUTOMATION TECHNOLOGY NETWORK

(75) Inventors: Ulrich Kaiser, Basel (CH); Jorg Reinkensmeier, Steinen (DE); Werner Thoren, Steinen (DE)

(73) Assignee: Endress + Hauser Process Solutions AG, Kagenstr, Reinach (CH)

( * ) Notice: Subject to any disclaimer, the term of this patent is extended or adjusted under 35 U.S.C. 154(b) by 0 days.

(21) Appl. No.: 12/735,237

(22) PCT Filed: Dec. 15, 2008

(86) PCT No.: PCT/EP2008/067481
§ 371 (c)(1),
(2), (4) Date: Jul. 7, 2010

(87) PCT Pub. No.: WO2009/087015
PCT Pub. Date: Jul. 16, 2009

(65) Prior Publication Data
US 2010/0297942 A1    Nov. 25, 2010

(30) Foreign Application Priority Data
Jan. 9, 2008   (DE) .................. 10 2008 003 574

(51) Int. Cl.
H04B 7/00      (2006.01)
H04W 12/06     (2009.01)

(52) U.S. Cl.
CPC .... *H04W 12/06* (2013.01); *G05B 2219/31121* (2013.01); *G05B 2219/33192* (2013.01)

(58) Field of Classification Search
CPC ............................................. G05B 2219/31121
USPC ...... 455/41.2, 63.3, 297, 404.1, 456.1; 705/8
See application file for complete search history.

(56) References Cited

U.S. PATENT DOCUMENTS

2003/0211889 A1*  11/2003  Walker ................... A63F 3/081
                                                      463/42
2004/0203377 A1*  10/2004  Eaton et al. ................. 455/41.2
2006/0012479 A1*   1/2006  Ezra ........................... 340/572.1

FOREIGN PATENT DOCUMENTS

| EP | 1 566 938 A1 | 8/2005 |
| WO | WO 2005/103851 A1 | 11/2005 |
| WO | WO 2006/037784 A1 | 4/2006 |
| WO | WO 2007/078930 A2 | 7/2007 |

* cited by examiner

*Primary Examiner* — Hsin-Chun Liao
(74) *Attorney, Agent, or Firm* — Bacon & Thomas, PLLC

(57) ABSTRACT

A method for integrating at least one field device, which is connected with a mobile unit, into a network of process automation technology. The mobile unit authenticates itself via a connection in the network, and that it receives at least one integration parameter for integration into the network (3).

6 Claims, 1 Drawing Sheet

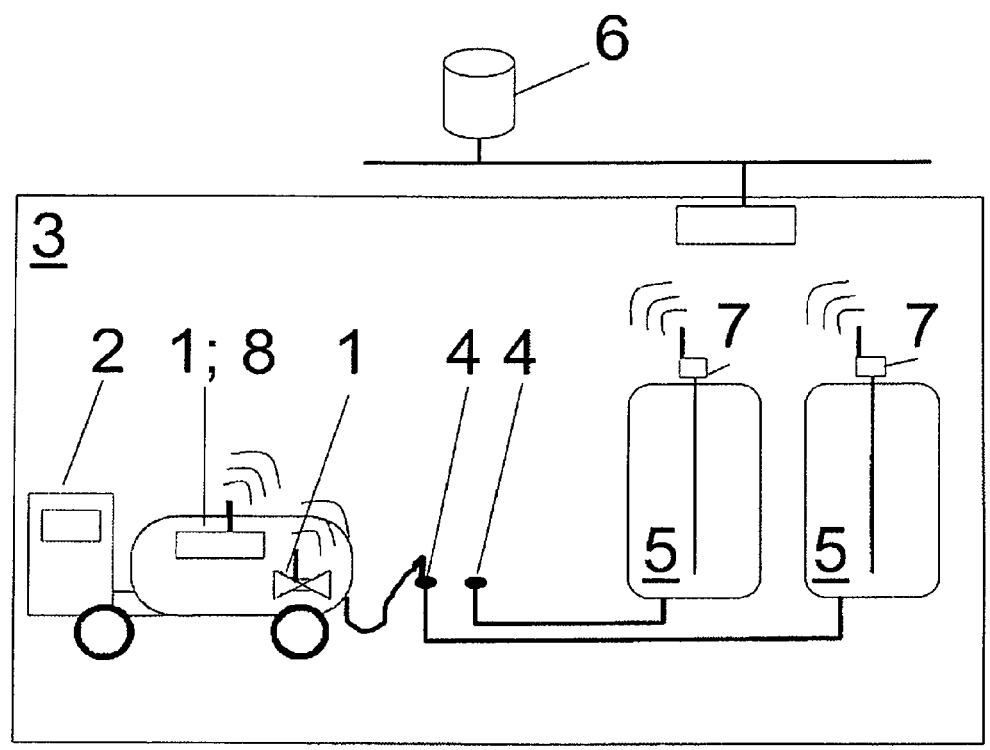

METHOD FOR INTEGRATING A FIELD DEVICE INTO A PROCESS AUTOMATION TECHNOLOGY NETWORK

TECHNICAL FIELD

The invention relates to a method for integrating at least one field device, which is connected with a mobile unit, into a network of process automation technology.

BACKGROUND DISCUSSION

In modern process automation technology, many systems and plants are already operated with local and fixed networks, in which individual field devices—for example, measuring devices/sensors or actuators—or other firmly installed components are included, and over which they can exchange data and information with one another, for example, via radio.

During operation of a process plant, it can occur, again and again, that, for example, for various delivery procedures, mobile units—e.g. transport vehicles, for instance tank vehicles, such as tank cars or tank trucks—come into the plant. Most often, these mobile units themselves have at their command measuring devices or other field devices, or, for example, have their own display units as well. In such case, however, the connection between the facility and the field device of the mobile unit generally takes place only visually, or via a subsequent matching. That is to say, the field device of the mobile unit, in particular, does not become a participant in the existing network. The cause of this is, among other things, the fact that for safety reasons, it is not possible simply to open the existing network, for example, for just any participant.

SUMMARY OF THE INVENTION

It is therefore an object of the invention to provide a method, by which a mobile unit (or a field device of a mobile unit) can safely—and especially temporarily—be integrated into an existing network.

The invention achieves the object by a method for integrating at least one field device, which is connected with a mobile unit, into a network of process automation technology, wherein the mobile unit authenticates itself via a connection in the network, and wherein the mobile unit receives at least one integration parameter for the integration into the network. The authentication is, in such case, the procedure of reviewing (verifying) a claim of authenticity, wherein, in given cases, the network only grants the mobile unit limited access to the network. The method of the invention thus includes at least the following steps: In an existing network, a mobile unit authenticates itself, i.e. the mobile unit delivers a proof of its identity to the network, and, in such case, directly or indirectly, also concerning its right to receive access to the network. Following this, the mobile unit receives at least one integration parameter for the integration into the network; that is to say, the mobile unit (or more specifically, the field device) receives at least one piece of information, in order to be able to integrate itself into the network. In given cases, these integration parameters are also embodied in such a way, that the field device can only integrate itself into the network for a predeterminable period of time. In such case, the parameters are, for example, transmitted by the network itself to the mobile unit, or to its at least one field device. On the whole, the method thus concerns a secure (since the participant must authenticate itself), temporary integration. The authentication is, in such case, preferably performed via a secure connection. In one embodiment, the authentication is, in such case, especially performed via a cable connection, whereas the communication in the network takes place, for example, via radio. The integration is, in such case, preferably of such a sort—or the integration parameter or the parameters is/are of such a sort—that a bidirectional data exchange between the temporarily integrated field device and the existing network is possible. In an additional embodiment, the field device can only introduce data into the network; or, in another additional embodiment, the field device or the mobile unit can only receive data from field devices already firmly installed in the network.

An embodiment of the method of the invention provides that the authentication is at least performed via a wireless, close-range connection, especially via the application of at least one RFID. In an embodiment, the mobile unit is, in such case, equipped with at least one RFID (Radio Frequency Identification) transponder —and the plant has at least one suitable RFID reading device.

An embodiment of the method of the invention includes that the network is a self-organizing ad hoc network, and the at least one integration parameter is the time slot/frequency-hopping pattern of the network. This embodiment involves, for example, a mesh network, in which the information concerning the time slot/frequency-hopping pattern is required for the integration of a participant.

An embodiment of the method of the invention includes that at least one identification point is provided, and the authentication of the mobile unit is at least partially performed at this identification point. At the identification point, for example, information concerning the identity (or concerning the proof of the identity) of the mobile unit is read out or recorded. In one embodiment, the matching of the data, or the verification, occurs directly at this identification point, and in an additional embodiment, it occurs in connection with a control station in which the matching or confirming data are suitably furnished or stored, and which is preferably connected with the identification point via a secure connection. For security purposes, the data transmitted via this secure connection are encrypted, for example.

An embodiment of the method of the invention provides that, via the identification point, at least one component of the network is uniquely assigned for communication with the mobile unit. This particular component of the network is, for example, a field device, which is firmly installed in the network, and which, for example, is secured on a tank which it monitors, or which measures a process variable of this tank. Another component can also be a data storage device, to which the field device of the mobile unit is permitted to transmit its measurement data. Thus, not only does the identification or authentication of the mobile unit take place via this identification point, but, instead, it is also established, which components of the existing system or network the mobile unit is permitted to have access to, i.e. where the unit itself is permitted to deliver data to, or from where it is permitted to receive data. Thus, an association between the mobile unit and a component or components of the network takes place via the identification point. In such case, the integration parameters are, in one variant, embodied in such a manner, that through them, only communication with these selected components of the network is possible.

An embodiment of the method of the invention provides that the mobile unit is a tank vehicle. An embodiment of the method of the invention includes that tank level data are transmitted to the mobile unit, and fill amounts are transmitted to the network. In these embodiments, a tank vehicle is thus integrated into the network as a mobile unit, or the tank vehicle enters into the process plant, in which the network is located. Such a tank vehicle is usually used to fill tanks, or it is itself filled with a medium (e.g. a liquid or a bulk good) from a tank. For the filling procedure, the tank vehicle receives information from the plant or from the network concerning the tank level or fill level (preferably that of the tank which it fills, or which it is filled by). Furthermore, the tank vehicle, to the extent that it has a suitable device at its disposal, transmits to the network data concerning fill amounts. For this purpose, for example, a flow measuring device is installed on the mobile unit, or the flow measuring device is the field device, which is integrated into the existing network.

An embodiment of the method of the invention includes that the identification point is associated with a filling nozzle for at least one tank. In this embodiment, the mobile unit thus identifies itself exactly at the spot where the physical connection with the plant is also effected.

BRIEF DESCRIPTION OF THE DRAWINGS

The invention will now be explained in greater detail on the basis of the appended drawing, the sole figure of which show as follows:

FIG. 1 is a schematically illustrated plant of process automation technology.

DETAILED DISCUSSION IN CONJUNCTION WITH THE DRAWINGS

FIG. 1 shows an example of a system of process automation technology, in which a tank truck is presented as an example of a mobile unit 2. The tank truck 2 is connected via a fill nozzle—which here also serves as an identification point 4—with a tank 5. By way of example, there is located on this fill nozzle 4 an RFID reader, which reads out the authenticating data from the RFID of the tank truck 2. These authenticating data are then, for example, compared via a secure (in given cases, cable-based) data line with data stored or furnished in the control station 6. In another embodiment, the match data are stored directly on-site, i.e. at the identification point 4. In an additional embodiment, a combination of the two aforementioned embodiments takes place, in which a first data match takes place with the control station 6, and, after a successful authentication at the identification point 4, the access data is stored locally, in order thereby to accelerate the "application procedure" in the case of a future connection of the same mobile unit 2 at this identification point.

The identification points 4 are, in given cases, for example, distributed throughout the tank plant or other process plant and, in each case, associated with specific components of the plant, or with a part of the stationary field devices.

If the comparison of the data shows that the mobile unit 2 is permitted to obtain access to the network 3—or especially to the measurement data of the measuring device 7 mounted on the tank 5 (to whose fill nozzle 4 the tank truck 2 is connected)—then the integration parameters needed for access to the existing network 3 are transmitted in the reverse direction to the mobile unit 2. This occurs here, for example, via a wireless connection. With these integration parameters, it is possible for the mobile unit 2 to access the measurement data of the measuring device 7 mounted on the tank 5, and, for example, to present these data on a display 8—as a purely presentational field device 1—of the mobile unit 2.

Furthermore, the mobile unit 2 has at its disposal here, for example, an officially calibrated flow meter as a field device 1, via which it is possible to measure the amount of medium given or received by the tank 5. In such case, the measurement data of this calibrated flow meter 1 are, for example, transmitted directly to the measuring unit 7 of the tank 5, and, at the same time, to the central control station 6. Furthermore, in one embodiment, there is in the mobile unit 2 also a memory unit, in which the measurement data of the measuring device 7 of the tank and the measurement data of the mobile unit's 2 own flow meter 1 are recorded. These data are then transmitted to an accounting center, for example, when the mobile unit 2 leaves the process plant. In an additional embodiment, it is provided that, during the authentication for introducing a measuring device as a field device 1 of the mobile unit 2, it is also, inquired as to whether the measuring device is calibrated, for example, officially calibrated. In an additional embodiment, a mutual calibration is associated with a matching of the data of the stationary field devices with the data of the mobile field device or mobile field devices.

The method of the invention may thus be viewed as follows: Via a secure data line (which, for example, is cable-based), a mobile unit 2 authenticates itself in an already existing network 3 (or in a process automation system). This system has, for example, a series of field devices 7 at its disposal, for example, a series of measuring devices and/or actuators and/or control units. After a successful authentication, the mobile unit 2 receives from the network 3—or especially from at least one of the present field devices 7—the needed integration parameters, with which it is possible for the mobile unit 2 to access individual—in given cases, specially selected—field devices 7, or via which the mobile unit 2 is permitted to introduce a field device 1 of its own into the existing network. It is thus possible, for example, to access measurement data of individual field devices 7, and to display these data in or on the mobile unit 2, or to compare these data with the mobile unit's 2 own data, or to store these data in the mobile unit 2. The data can be used, then, for example, for matching, for calibration or for verification for an invoice.

The invention claimed is:

1. A method for integrating at least one field device, which is connected with a tank vehicle, into a network of process automation technology, comprising the steps of:
    self-authentication of the tank vehicle at an existing network;
    receiving by the tank vehicle at least one integration parameter from the network, for integration into the network, wherein the at least one integration parameter is embodied in such a way that the field device can only integrate itself into the network for a predeterminable period of time; and
    integrating the tank vehicle into the existing network for the predetermined period of time, whereas a bidirectional data exchange between the temporarily integrated field device of the tank vehicle and the existing network is established, wherein tank level data from a tank which is filled by the tank vehicle, or from a tank which fills the tank vehicle, are transmitted to the tank vehicle and fill amounts are transmitted to the network.

2. The method as claimed in claim 1, wherein:
the authentication is at least performed via a wireless close-range connection, especially via use of at least one RFID.

3. The method as claimed in claim 1, wherein:
the network is a self-organizing, ad hoc network, and the at least one integration parameter is a time slot/frequency-hopping pattern of the network.

4. The method as claimed in claim 1, wherein:
at least one identification point is provided, and the authentication of the tank vehicle is at least partially performed at the identification point.

5. The method as claimed in claim 4, wherein:
via the identification point, at least one component of the network is uniquely associated with the tank vehicle for communication.

6. The method as claimed in claim 4, wherein:
the identification point is associated with a fill nozzle for at least one tank.

* * * * *